United States Patent
Späh et al.

(10) Patent No.: US 6,694,481 B1
(45) Date of Patent: Feb. 17, 2004

(54) METHOD AND DEVICE FOR READING PROGRAMMES INTO A PROCESSOR-CONTROLLED DEVICE

(75) Inventors: Jürgen Späh, Überlingen (DE); Benno Petersen, Uhldingen (DE)

(73) Assignee: Bodenseewerk Geratetechnik GmbH, Bodensee (DE)

(*) Notice: Subject to any disclaimer, the term of this patent is extended or adjusted under 35 U.S.C. 154(b) by 0 days.

(21) Appl. No.: 09/623,656

(22) PCT Filed: Feb. 25, 1999

(86) PCT No.: PCT/EP99/01211
§ 371 (c)(1),
(2), (4) Date: Nov. 27, 2000

(87) PCT Pub. No.: WO99/45458
PCT Pub. Date: Sep. 10, 1999

(30) Foreign Application Priority Data

Mar. 4, 1998 (DE) ........................................ 198 09 075

(51) Int. Cl.[7] ............................................... G01R 31/28
(52) U.S. Cl. ........................................ 714/822; 714/819
(58) Field of Search .................... 341/176; 714/716, 714/822, 742, 712, 819; 359/110, 153, 137; 385/48; 356/73.1; 381/314

(56) References Cited

U.S. PATENT DOCUMENTS

| | | | | |
|---|---|---|---|---|
| 5,515,035 A | * | 5/1996 | Gut | 340/825.5 |
| 5,822,099 A | * | 10/1998 | Takamatsu | 359/153 |
| 5,912,752 A | * | 6/1999 | Mollett et al. | 359/137 |
| 6,366,724 B1 | * | 4/2002 | Jennings et al. | 385/48 |

* cited by examiner

*Primary Examiner*—Albert Decady
*Assistant Examiner*—Mujtaba Chaudry
(74) *Attorney, Agent, or Firm*—Mallinckrodt & Mallinckrodt

(57) ABSTRACT

The invention relates to a method for reading programmes into a device which processes data using a processor, according to a programme stored in a programme memory. A programming device sends programme data to the programme memory of the device to be programmed in the form of a data stream. The inventive method comprises the following steps: a) activating a light transmitter in accordance with the programme data, so that said light transmitter generates digital light signals in accordance with the programme data; b) receiving the light signals with a light receiver which is permanently installed on the device to be programmed and c) applying the signals of the light receiver of the device to be programmed to the programme memory of the same. The invention also relates to a device for carrying out this method.

4 Claims, 3 Drawing Sheets

METHOD AND DEVICE FOR READING PROGRAMMES INTO A PROCESSOR-CONTROLLED DEVICE

TECHNICAL FIELD

The invention relates to a method for reading programs into a device, which processes data by means of a processor according to a program stored in a program memory, and by which program data are supplied as a data stream by a programming device to the program memory of the device to be programmed.

The invention further relates to a device for reading programs into a device, which processes data by means of a processor according to a program stored in a program memory, and in which program data are adapted to be supplied as a data stream by a programming device to the program memory of the device to be programmed.

In the sense of the invention, "program" can be a sequence of data processing steps for processing data. However, "program" is also an operating system or the software-determined configuration of hardware components of the device.

BACKGROUND ART

It is known to transmit programs in devices controlled by processors by means of data carriers, on which the program is stored and from which the program is read into the data memory of the device by means of a reading unit. Many devices controlled by processors do not allow to provide a drive unit for a data carrier having a reading unit in the device itself. Then the program has to be transmitted through a cable from a programming device, for example a computer.

A further possibility is to exchange program modules or program memories in the device.

All of these cases require mechanical intervention into the device controlled by processors. A plug of a cable has to be inserted or components have to be replaced. This is cumbersome and requires eventually the device to be reconstructed and/or opened. Plug bushings require space which often is not available. As a result of the mechanical intervention, damage can be made by electrostatic discharge (EDS). The transmission of the program data can be disturbed by outer electric or electromagnetic influences. Protection devices, for example against EDS, have to be removed in order to transmit the program data.

It is known to transmit data by wireless transmission between devices, for example between personal computers, by means of a light transmitter and a light receiver. These data are information to be processed or stored, and are not program data, which determine the program for processing such information by means of the processor. These data are written into a working memory, not into the program memory of the device.

According to the prior art, programs of the type defined above are changed through data carriers and/or cables or through exchange of components.

Obviously there has been made a distinction between the "volatile" data to be processed, for example measuring values to be processed, and the "fixed" program data, which determine the execution of the data processing. The latter has been input "conventionally" through cables or the like, which obviously has been found to be the safest method.

Through European patent application EP-A-0 457 940 it is known to input updates into an electronic device provided with a processor by means of a programming device to reprogram the device. It is also suggested to effect a wireless transmission of the programs by using infrared light.

Using this type of programming there is a risk of transmission errors and, thus, of programming errors.

DISCLOSURE OF INVENTION

It is the object of the invention, with a method and a device for reading program data of the type described above, to avoid errors, which may occur as a result of mechanical connections between the programming device and the device to be programmed, as a result of mechanical intervention into the device to be programmed, or as a result of errors when using wireless data transmission.

According to the invention this object is achieved by a method having the method steps of:

(a) activating a light transmitter in accordance with the program data, such that the light transmitter generates digital light signals in accordance with the program data,
(b) receiving the light signals with a light receiver fixed to the device to be programmed,
(c) applying the signals of the light receiver of the device to be programmed to the program memory of this device, wherein
(d) information is transmitted through light signals in both directions between the programming device and the device to be programmed, and
(e) the transmission of the program data is effected interactively between the programming device and the device to be programmed, in which, according to the invention, (f) after transmission of the program data from the programming device to the device to be programmed, the program data thus transmitted and stored in the program memory of the device to be programmed are retransmitted through light signals to the programming device for verification.

A device for carrying out this method comprises (a) a light transmitter and means for digitally activating the light transmitter with the program data supplied from the programming device and generating corresponding pulsed infrared light signals,
(b) a light receiver fixed to the device to be programmed, to which the light signals are applied and which generates program data from pulsed signals of the light receiver according to a log predetermined for the light transmitter and the light receiver, and
(c) means for reading the program data thus obtained into a program memory of the device to be programmed, wherein
(d) both the programming device and the device to be programmed each have a light transmitter and light receiver unit, such that the data are transmittable interactively,
(e) the device to be programmed comprises means, which, after transmission of the program data from the programming device to the device to be programmed, are adapted to retransmit to the programming device the program data thus transmitted and stored in the program memory of the device to be programmed through the light transmitter unit of the device to be programmed and the light receiver unit of the programming device, and
(f) the programming device comprises verification means for verification of the program thus transmitted to the device to be programmed and retransmitted from it.

Thus, according to the invention, the loading of the program, that means the input of the program data in to the program memory, is effected through wireless transmission and light between the light transmitter and light receiver, the light receiver being fixed to the device. In this manner, no mechanical interventions into the device are required. Damage due to electrostatic discharge cannot occur. The light receiver only requires small space. Disturbances due to electromagnetic influences do not occur. Due to retransmission of the program data and verification of the same, it is ensured, when using the wireless transmission, that no program errors can occur or that such program errors are detected.

It has also been found that in this manner programs can be read through wireless transmission into the program memory with sufficient security. Unintentional changes of the program, for example when data to be processed are input through light transmitter and light receiver, are avoided by the mode of transmission.

Modifications of the invention are subject matter of the sub-claims.

An embodiment of the invention will now be described in greater detail with reference to the accompanying drawings.

PREFERRED EMBODIMENT OF THE INVENTION

Figure 1:
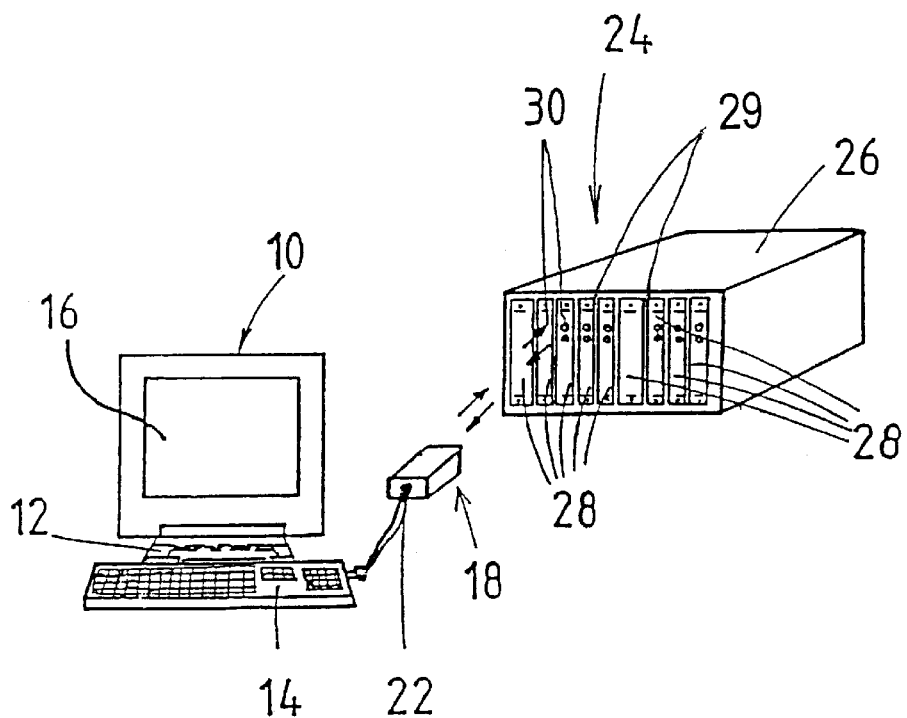
FIG. 1 shows an example of a device for loading programs into devices, which here are formed by modules, which are arranged in a cabinet.

Numeral 10 designates a programming device. This can be a conventional personal computer. The essential basic components of a personal computer in the function of a programming device are a computer housing 12, a key board 14, a monitor 16 and a transmitter and receiver unit 18. A computer (not shown in this illustration) with the processor and several interfaces are arranged in this computer housing 12. The personal computer is connected through a cable 22 to an external infrared transmitter and infrared receiver unit 18 through, for example, a serial interface. The serial interface is controlled by the processor of the computer. The data stream is transmitted sequentially through this serial interface. However, also parallel interfaces or other data bus systems having corresponding data transmission can be used. Data are processed digitally by the personal computer. Thus, the program data are also guided as digitally coded data streams to the infrared transmitter and infrared receiver unit 18 and transmitted form this as pulsed light streams.

A work unit 24 consists of a cabinet 26 having modules in the form of housing inserts 28. These modules are the devices to be programmed. The housing inserts 28 are located one next to the other in the cabinet 26. Each module extends through a plate 29. One processor-controlled control unit, which is not shown in the illustration of FIG. 1, is provided in each one of the housing inserts 28. Each processor-controlled control unit is coupled to an infrared transmitter and infrared receiver unit 30. In this embodiment, the infrared transmitter and infrared receiver unit 30 is an integral part of each device to be programmed, that means each of the housing inserts 28, and is fixedly attached with transmitter and receiver units 30 on the portion of the housing insert 30 which extends through front plate 29.

Figure 2:
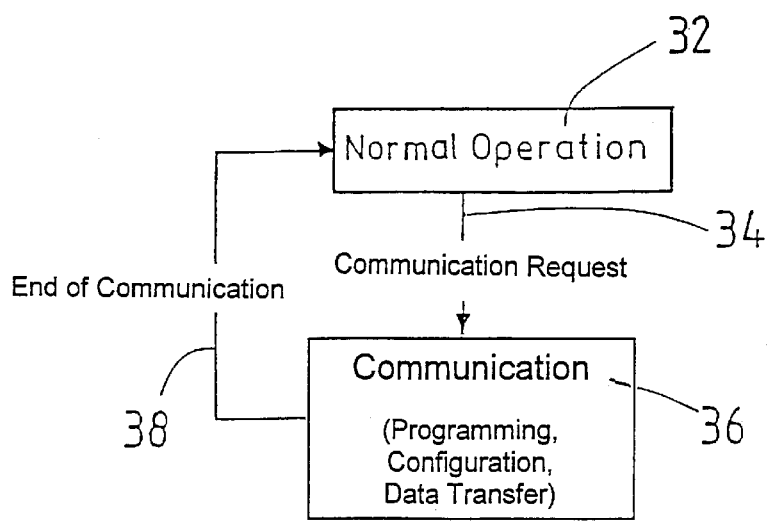
FIG. 2 is a schematic block diagram of a communication setup.

A communication setup is schematically illustrated as block diagram in FIG. 2. The programming device 10 as well as the work unit 24 make a request to the corresponding infrared receiver in determined time intervals, whether a communication shall be effected with the respective other device or not. The normal state is symbolized by block 32. The arrow 34 indicates a communication request to the respective other device. If the request is confirmed by the respective other device, then a data exchange can take place. The data exchange is symbolized by block 36. When data are not exchanged any more between programming device 10 and work unit 24, then the end of communication is signaled to the respective other device. This is shown by arrow 38, which indicates that the devices are reset to the normal state.

Figure 3:
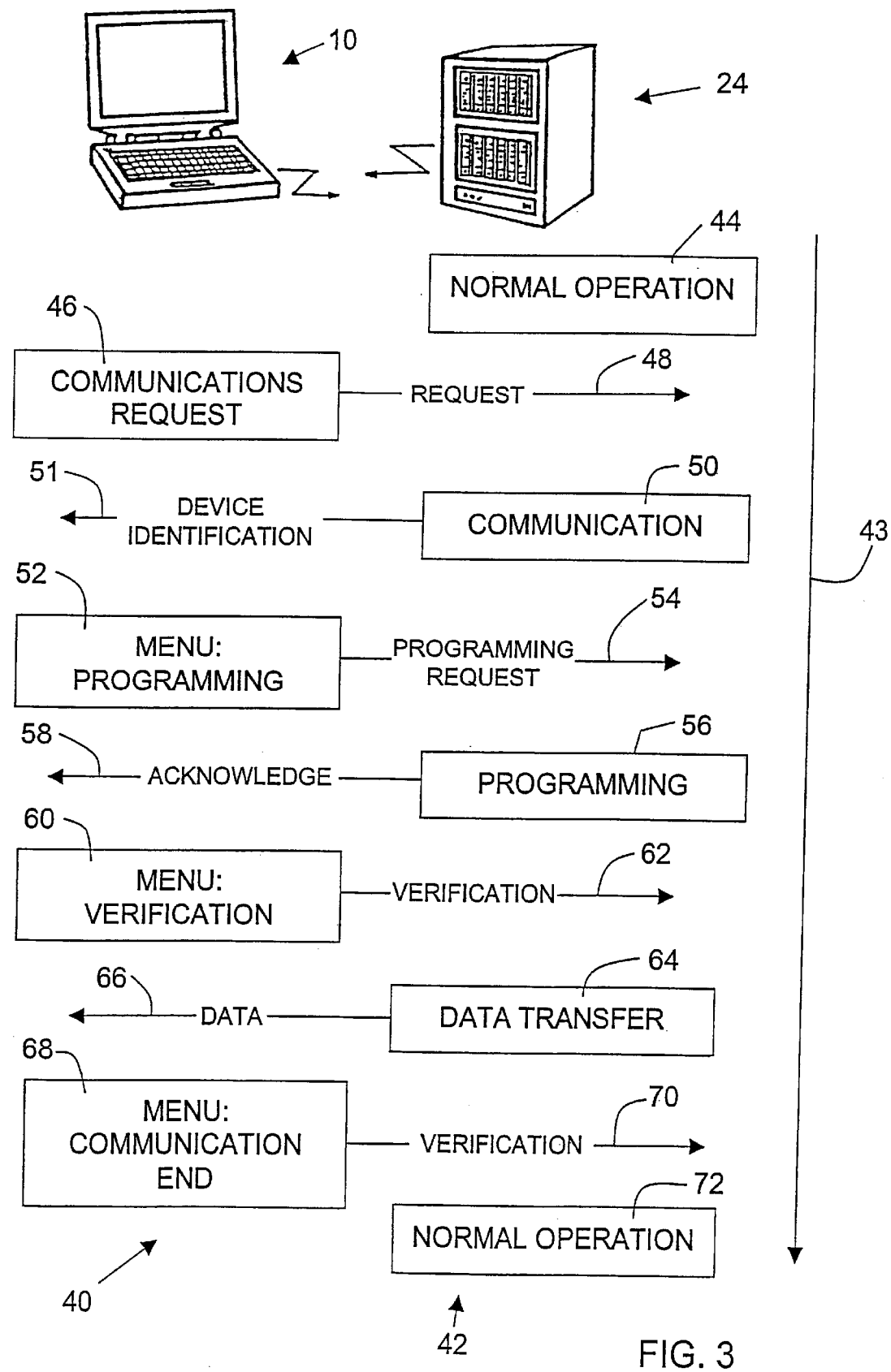
FIG. 3 shows an example of use of a programming device and of the programming method.

FIG. 3 illustrates the dialogue more in detail. The programming device 10 as well as the work unit 24 each have an integral infrared transmitter and infrared receiver unit 18 and 30, respectively. The left column 40 of the work flow is the part which is effected by the programming device 10, while the right column 42 of the work flow is the part which is effected by the work unit 24. The direction of the work flow in time is determined by the arrow 43. At first, the work unit 24 is in the normal state, which is illustrated by block 44. In block 46 the programming device 10 at first makes a request to the work unit 24, whether data can be exchanged or not. This is symbolized by arrow 48. Block 50 represents the first communication, in which the work unit 24 identifies itself to the programming device, as symbolized by arrow 51. Through a user interface of the programming device 10, illustrated by block 52, the programming is set, for example through a menue, and signaled to the work unit 24. This is indicated by arrow 54. Now the work unit is ready. The programming is effected, block 56. The confirmation to the programming device 10 is effected through arrow 58. Subsequently, "verifying programming" is selected in the menue of the programming device 10, symbolized by block 60. The programming device transmits corresponding signals 62 to the work unit 24. This changes to data transfer— block 64—and transmits the data stream, arrow 66, to the programming device 10. The programming device 10 checks the data. In block 68 "end of communication" is selected from the menue of the programming device 10. The confirmation is transmitted to the work unit 24—arrow 70. Now the work unit is reset to its normal state, block 72.

Figure 4:
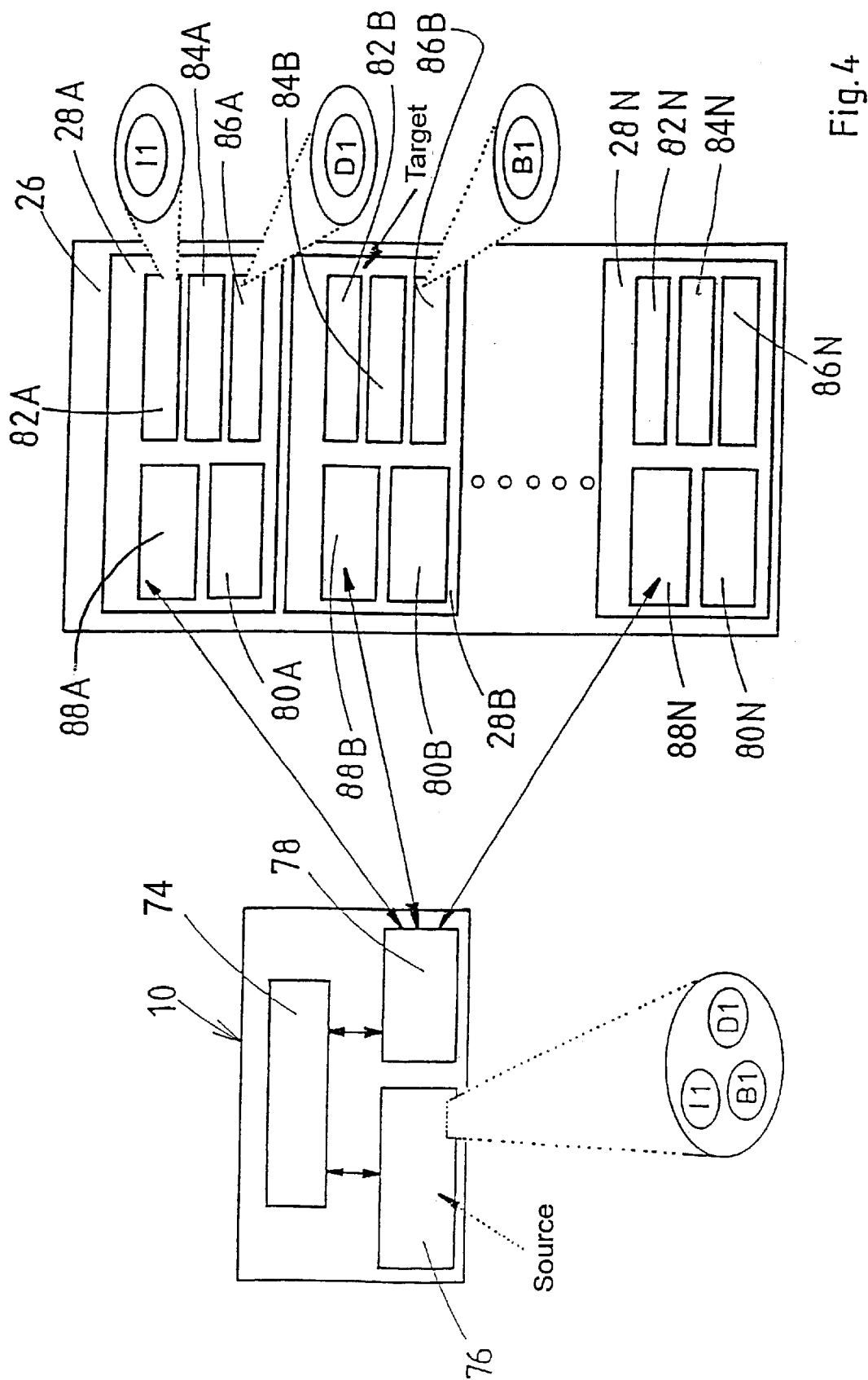
FIG. 4 is another illustration of the device of FIG. 1.

FIG. 4 is a slightly different illustration of the device of FIG. 1.

The programming device 10 comprises a processor 74 and a memory 76, in which the programs to be written into the device to be programmed are stored. Furthermore, the programming device 10 comprises an interface 78 for the data transmission. The interface 78 includes the infrared transmitter and infrared receiver unit 18. In the framework of dialogue described with reference to FIG. 3, the processor 74 reads the program data from the memory 76 and activates the interface, such that the infrared transmitter and infrared receiver unit 18 transmits a pulsed infrared light beam corresponding to the program data to be transmitted.

The device to be programmed, or rather the devices to be programmed, are modules which are located as housing inserts 28A, 28B, ... 28N in the rectangular cabinet 26. Each housing insert 28A, 28B, ... 28N comprises a processor 80A, 80B, ... 80N, a program memory 82A, 82B, ... 82N, a data memory 84A, 84B, . . . 84N and an operating system 86A, 86B, . . . 86N. One interface 88A, 88B, . . . 88N for the data transmission is provided at each housing insert 28A, 28B, . . . 28N. These interfaces include the infrared transmitter and infrared receiver unit 30 attached to the front plate of each housing insert 28A, 28B, . . . 28N.

The programming device 10 can now supply different types of program data with corresponding coding and supply them through the interface 78 and the infrared transmitter and infrared receiver unit as infrared light signals to the infrared transmitter and infrared receiver unit 30 of the devices to be programmed. This is illustrated in FIG. 4 by the symbols B1 and D1 for an operating system and I1 for a data processing program. The operating system program data D1 and B1 are applied to the respective operating systems 86A and 86B, respectively. The program data of the data processing program I1 are applied to the program memory 82A. The data transmission is effected in a dialogue of the type described with reference to FIG. 3.

A plurality of housing inserts 28 can be programmed in parallel by the programming device 10. However, it is also possible to program individual housing inserts or to program the housing inserts one after the other.

What is claimed is:

1. A method for transmitting programs from a programming device into a device to be programmed, said device to be programmed comprising a processor, a program memory, a light transmitter unit and a light receiver unit, said processor adapted to process data according to a program stored in said program memory, said programming device comprising a light transmitter unit and a light receiver unit and generating and interactively supplying a program representing a sequence of instructions to be interpreted and performed by the processor in the device to be programmed rather than by a program already stored in the program memory as a data stream to said program memory of said device to be programmed, said method having the method steps of:

(a) activating said light transmitter unit of said programming device in accordance with said program representing a sequence of instructions to be interpreted and performed by the processor in the device to be programmed rather than by a program already stored in the program memory, such that said light transmitter unit of said programming device generates digital light signals in accordance with said program;

(b) receiving said digital light signals by said light receiver unit of said device to be programmed and generating light receiver signals;

(c) applying said light receiver signals to said program memory of said device to be programmed;

(d) storing said program thus transmitted in said program memory of said device to be programmed;

(e) retransmitting said stored program as light signals from said light transmitter unit of said device to be programmed to said light receiver unit of said programming device; and (f) comparing said retransmitted program with said program generated in said programming device for verification.

2. The method of claim 1, wherein said program is transmitted serially to said light transmitter unit of said programming device and from said light transmitter unit of said programming device to said light receiver unit of said device to be programmed according to a log predetermined for said light transmitter unit and said light receiver unit.

3. A device for transmitting programs from a programming device into a device to be programmed, said device to be programmed comprising a processor and a program memory, said processor adapted to process data according to a program stored in said program memory, said programming device generating and interactively supplying a program representing a sequence of instructions to be interpreted and performed by the processor in the device to be programmed rather than by a program already stored in the program memory as a data stream to said program memory of said device to be programmed, comprising:

a first light transmitter unit associated with said programming device;

a first light receiver unit associated with said programming device;

a second light transmitter unit associated with said device to be programmed;

a second light receiver unit associated with said device to be programmed;

activating means for digitally activating said first light transmitter unit in accordance with said program representing a sequence of instructions to be interpreted and performed by the processor in the device to be programmed rather than by a program already stored in the program memory and causing generation of corresponding pulsed infrared light signals from said first light transmitter unit;

means for generating program data from said pulsed signals of said first light receiver unit according to a log predetermined for said first light transmitter unit and said second light receiver unit;

means for reading said program thus obtained into said program memory of said device to be programmed;

retransmitting means associated with said device to be programmed for retransmitting said program stored in said program memory of said device to be programmed to said programming device through said second light transmitter unit and said first light receiver unit; and verification means associated with said programming device for verification of said program thus transmitted to said device to be programmed and retransmitted from said device to be programmed back to said programming device.

4. The device of claim 3, wherein said device to be programmed constitutes one of several modules, which are located in a cabinet side by side or one above the other; and said second light receiver unit is attached to a front side of said module and is connected to said program memory of said module through an interface.

* * * * *